United States Patent
Inose et al.

(10) Patent No.: US 6,910,634 B1
(45) Date of Patent: Jun. 28, 2005

(54) INFORMATION INPUT/ OUTPUT UNIT

(75) Inventors: Fumiyuki Inose, Tsukuba-gun (JP);
Satoshi Kawamura, Tsukuba-gun (JP);
Shin Shimizu, Tsukuba-gun (JP);
Toshiyuki Kaneko, Tsukuba-gun (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/129,846

(22) PCT Filed: Nov. 9, 2000

(86) PCT No.: PCT/JP00/07901

§ 371 (c)(1),
(2), (4) Date: May 10, 2002

(87) PCT Pub. No.: WO01/37213

PCT Pub. Date: May 25, 2001

(30) Foreign Application Priority Data

Nov. 12, 1999 (JP) .......................................... 11-323456

(51) Int. Cl.⁷ ................................................ G06K 7/00
(52) U.S. Cl. ..................................................... 235/486
(58) Field of Search .......................... 235/486; 343/895, 343/702; 342/42

(56) References Cited

U.S. PATENT DOCUMENTS

| 4,862,160 A | 8/1989 | Ekchian et al. |
| 5,736,729 A | * 4/1998 | Seppanen .................... 235/492 |
| 5,949,058 A | * 9/1999 | Kimura ........................ 235/486 |
| 6,128,604 A | * 10/2000 | Sakamaki et al. ............. 704/41 |

FOREIGN PATENT DOCUMENTS

| JP | 64-37686 A | 2/1989 |
| JP | 2-56089 A | 2/1990 |
| JP | 8-129630 A | 5/1996 |
| JP | 9-237137 A | 9/1997 |
| JP | 10-222620 A | 8/1998 |
| JP | 10-240579 A | 9/1998 |
| JP | 11-3406 A | 1/1999 |
| WO | 98/33142 A1 | 7/1998 |

* cited by examiner

Primary Examiner—Diane I. Lee
Assistant Examiner—Lisa M. Caputo
(74) Attorney, Agent, or Firm—Birch, Stewart, Kolasch & Birch, LLP

(57) ABSTRACT

An information input/output unit according to the present invention includes a receiving cavity capable of accommodating therein two different species of noncontact information media having shapes differing from each other and an antenna part capable of performing communication by radio with the noncontact information media. The unit can communicate with a close-fit-type noncontact information medium without fail and preferably with predetermined degree of freedom for the shapes of the media.

12 Claims, 20 Drawing Sheets

INFORMATION INPUT/ OUTPUT UNIT

This application is the national phase under 35 U.S.C. § 371 of PCT International Application No. PCT/JP00/07901 which has an International filing date of Nov. 9, 2000, which designated the United States of America.

TECHNICAL FIELD

The present invention generally relates to an information input/output unit, and more particularly the invention concerns an information input/output unit which can perform communication contactless with a noncontact information medium which incorporates therein an IC module capable of recording data. At this juncture, with the phrase "noncontact information medium incorporating an IC module", it is intended to mean a medium which is provided with an IC module including an IC chip as an information storing medium and which is designed for performing contactless or noncontact communication with external apparatus or equipment inclusive of the information input/output unit irrespective of the wavelength of radio wave and the distance or range of communication so far as it can be effectuated in a contactless or noncontact manner.

BACKGROUND ART

As a typical one of the noncontact information media each incorporating an IC chip or IC module, there may be mentioned a noncontact IC card designed for communicating with external apparatus or equipment by making use of an electromagnetic or radio wave and microwave. At this juncture, with the phrase "IC card" used in this specification, it is contemplated that smart card, intelligent card, chip-in card, microcircuit (microcomputer) card, memory card, super card, multi-function card, combination card and the like are to be comprehensively covered, by "IC card". It should further be mentioned that the shape of the noncontact information medium incorporating the IC chip is never restricted to the card-like shape. Accordingly, the noncontact information medium conceptually includes a so-called IC tag as well. Incidentally, with the phrase "IC tag", it is intended to mean all the information storing mediums of postage stamp size or of subminiature size smaller than the former or coin-like shape so far as the functions similar to those of the IC chip can be realized.

The information input/output unit according to the present invention can advantageously be implemented as a reader/writer designed for use in combination with a close-fit-type noncontact information medium having a relatively short range of communication on the order of zero to several millimeters by taking advantage of electromagnetic induction inter alia. However, the mate for the communication with the information input/output unit is not always restricted to such noncontact information medium that is equipped with the IC chip. It is sufficient that the noncontact information medium is provided with at least the antenna through which communication with the reader/writer can be effected. By way of example, the mate for the communication with the reader/writer may be a booster which includes a coil(s) and a capacitor(s) and which extends the communication range of the noncontact IC card.

The readers/writers may be classified into a contact type species and a noncontact type species in accordance with the methods of communication with the noncontact information media such as the IC chip, the IC tag and others. Among them, the noncontact type reader/writer has advantageous features that no contact failure occurs because of the absence of contacts with the IC card, the reader/writer can be used movably with a distance in the range of a few centimeters to several ten centimeters and that the reader/writer exhibits remarkable insusceptibility to soil, rain and static electricity, promising thus an increasing popularity together with the noncontact information media for the not-so-distant future.

The noncontact IC card is designed to make available an electric power for operation from the radio wave received from the reader/writer through electromagnetic induction and exchange data with the reader/writer. The noncontact IC card includes an antenna (e.g. antenna coil) and an IC chip as discrete or independent members, respectively. The antenna serves for transmission/reception of radio wave with the reader/writer. The IC chip includes a nonvolatile memory and the like and is electrically connected to the antenna. Packaging of this type noncontact IC card encounters technical difficulty in electrically connecting minute-size terminals of the IC chip with the antenna. Besides, wire breakage is likely to occur in the interconnecting portions under the influence of a stress applied to the card which is intrinsically flexible. Further, there is required a base plate or substrate for holding the IC chip and the antenna, involving increase in the manufacturing cost. Additionally, the inspection of the electrical interconnections, the antenna and the IC chip for confirming the operation can be carried out only after the IC chip and the antenna have been packaged and interconnected, which means that the manufacturing efficiency is not to be satisfied.

Under the circumstances, an coil-on IC chip in which the antenna coil is incorporated in the IC chip (i.e., on-chip implementation) has recently been proposed in view of the demand for miniaturization of components and multi-functional purpose. The coil-on IC chip is advantageous in that the problems involved in the packaging can be mitigated because the antenna coil and the IC chip are electrically connected to each other already at the wafer level. Additionally, the coil-on IC chip allows the noncontact information medium to be miniaturized in various shapes. In particular, in view of the fact that the reader/writer is expected to be used as a function extending device for the personal computer without being restricted to the use as the credit card or the like known heretofore, it is conceived that the shape of the noncontact information medium is not limited to the card but implemented in numerous and various types of shapes for many applications by taking into account the miniaturization, maneuverability or manipulatabillty, maintainability, aesthetic appearance, user's preference and so forth.

The conventional reader/writer known heretofore however suffers a problem that the data communication with the close-fit-type noncontact information medium whose communication range is short as on the order of several millimeters (e.g. the noncontact information medium incorporating the coil-on IC chip described above) can not be performed in a satisfactory manner. Certainly, the reader/writer can perform communication with the noncontact information medium having a relatively long communication range on the order of several centimeters to several ten centimeters with a distance from the noncontact information medium. However, for effecting communication with the close-fit-type noncontact information medium, it is required that not only the noncontact information medium is fit closely but also the antennas of both the noncontact information medium and the reader/writer are positioned accurately on the order of several millimeters. Under the circumstances, the coil-on IC chip has not been put to practical use yet due to the difficulty in positioning the noncontact information medium.

Furthermore, the conventional reader/writer known heretofore also suffers a problem that the degree of freedom is less afforded in respect to the shape of the close-fit-type noncontact information medium. In this conjunction, it is noted that the shape of the conventional noncontact information medium having a relatively long communication range does not present any serious problem because it is intrinsically designed to communicate with the reader/writer with a distance therefrom. By contrast, the close-fit-type noncontact information medium can be implemented in various shapes because of susceptibility to miniaturization in general. However, it becomes more difficult to position and fit closely the close-fit-type noncontact information medium relative to the reader/writer although it depends on the shape (e.g. coin-like shape of the close-fit-type noncontact information medium). Needless to say, the conventional readers/writers are not in the position to handle a plurality of various close-fit-type noncontact information media having different shapes, respectively.

DISCLOSURE OF INVENTION

In the light of the state of the art described above, it is a general and typical object of the present invention to provide a novel and useful information input/output unit which can solve the problems of the conventional information input/output units.

More specifically, it is a typical object of the present invention to provide an information input/output unit which is capable of communicating with a close-fit-type noncontact information medium without fail and preferably with a predetermined degree of freedom for the shapes of the media.

For achieving the objects described above, the information input/output unit according to an exemplary embodiment of the present invention, i.e., an exemplary mode for carrying out the invention, includes a main body having an antenna part for exchanging information with noncontact information media and is capable of performing information exchange with plural species of noncontact information media of different shapes incorporating internally communication-destined antennas at predetermined positions, respectively, wherein the information input/output unit is characterized by a means for selectively regulating positions of the noncontact information media in dependence on the species of the noncontact information media, respectively, such that the antenna part of the information input/output unit can face oppositely a location at which the communication-destined antenna is incorporated in the noncontact information medium of any species as selected. The information input/output unit described above can perform communication with plural species of noncontact information media having different shapes, respectively, by virtue of the provision of the position regulating means. Especially, the information input/output unit can positively perform communication with the noncontact information medium implemented with a closely fitting contour shape.

The information input/output unit according to another exemplary embodiment of the present invention includes a connecting portion for positioning the noncontact information medium having a curvilinear surface contour by engaging with the above-mentioned curvilinear surface contour and an antenna part capable of communicating with the above-mentioned noncontact information medium by radio. The information input/output unit of the arrangement described above can perform radio communication with a noncontact information medium having a curvilinear surface such as a coin shape and is capable of communicating with a noncontact information medium implemented in a closely fitting structure with high reliability by virtue of the function of positioning the noncontact information medium as assured by the connecting part.

The noncontact information medium according to a further exemplary embodiment of the present invention includes a first antenna part, a first IC chip connected to the first antenna part, a second antenna part and a second IC chip connected to the first antenna part. The noncontact information medium of the structure mentioned above can realize a multiplicity of functions or multi-function performance with the first and second IC chips (e.g. by storing and/or processing different types of data).

BEST MODES FOR CARRYING OUT THE INVENTION

Figure 1:
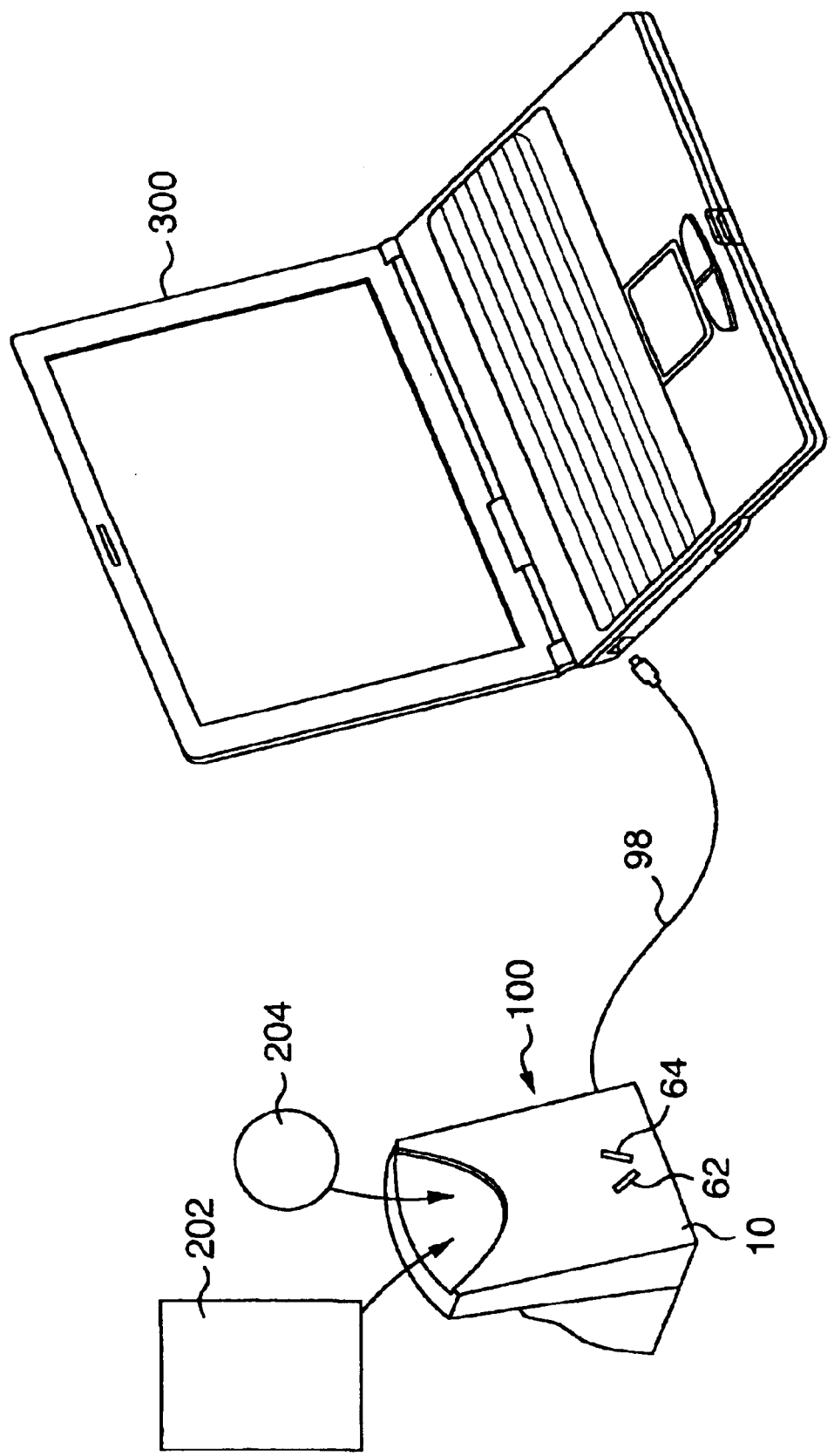
FIG. 1 is a schematic perspective view showing generally a communication system composed of an information input/output unit and a noncontact information medium according to an exemplary embodiment of the present invention together with an electronic apparatus.

In the following, description will be made of a reader/writer 100 which represents an exemplary embodiment of the information input/output unit according to the present invention by reference to the accompanying drawings. Incidentally, throughout the accompanying drawings, same parts or members are denoted by like reference numerals and repeated description thereof is omitted. The reader/writer 100 is connected to a note-type personal computer 300 which is an exemplary one of electronic apparatuses or equipments. The reader/writer is capable of communicating with both of a noncontact IC card 202 and a coin-shaped noncontact IC tag 204. Parenthetically, in the description which follows, both the noncontact IC card and the noncontact coin-shaped IC tag will collectively be referred to as "noncontact information medium or media". Thus, in the case of the instant embodiment, it is presumed, by way of example only, that the reader/writer 100 serves as a function extending unit for the note-type personal computer 300. Incidentally, FIG. 1 is a schematic perspective view showing generally a communication system 1 which is comprised of the reader/writer 100, the noncontact information media and the note type personal computer 300.

Figure 2:
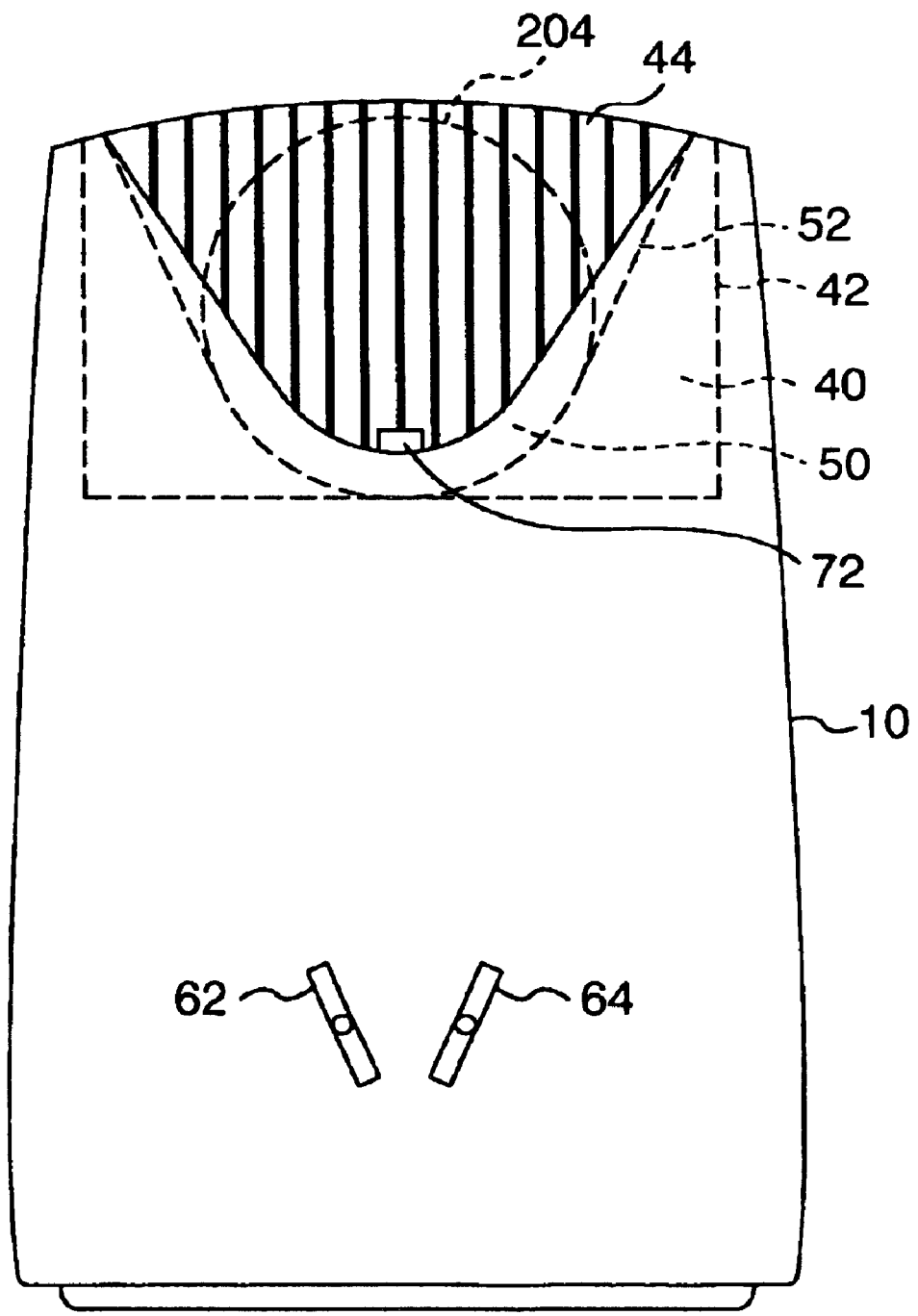
FIG. 2 is a front view of the information input/output unit shown in FIG. 1.
Figure 3:
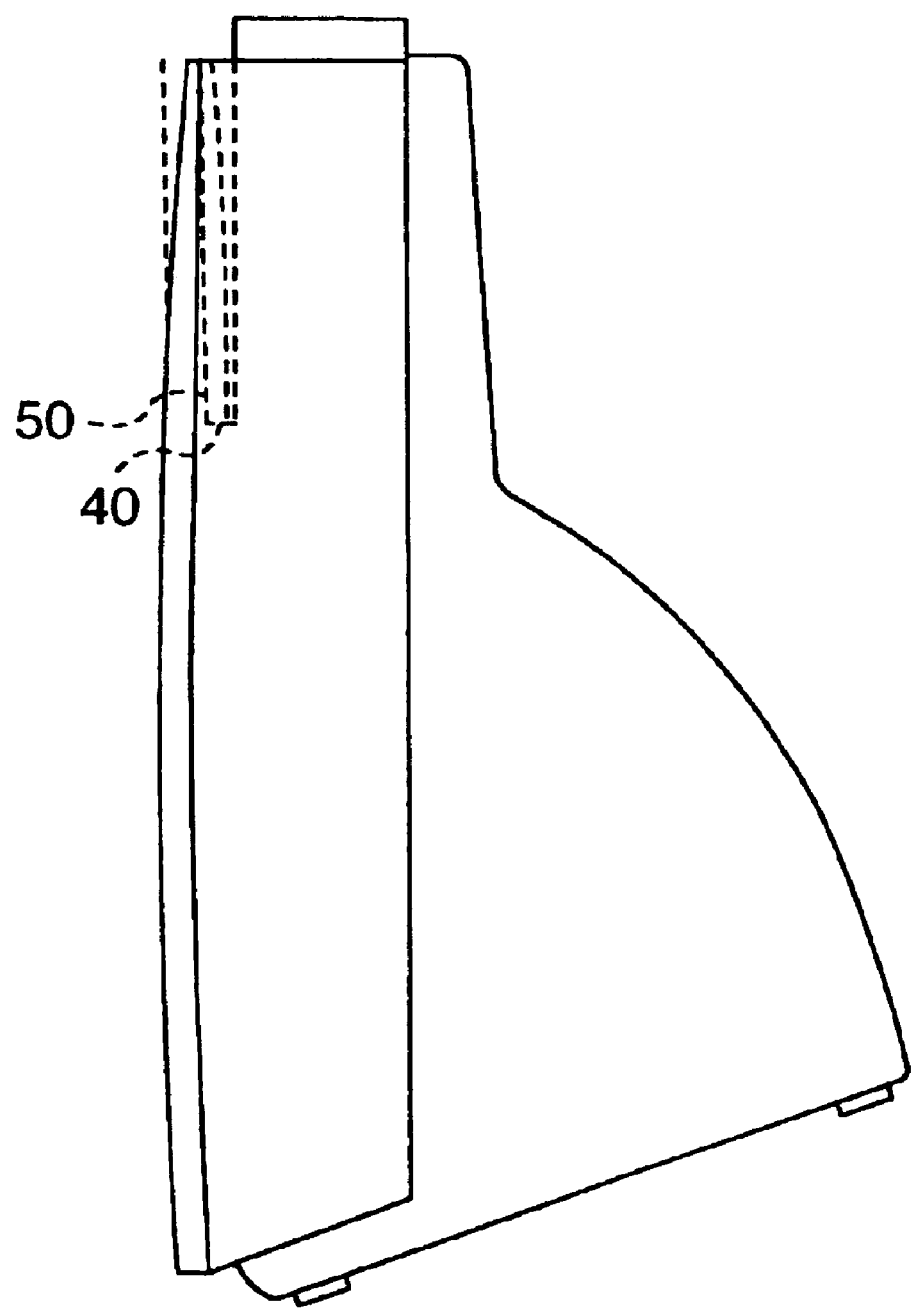
FIG. 3 is a side view of the information input/output unit shown in FIG. 1.
Figure 4:
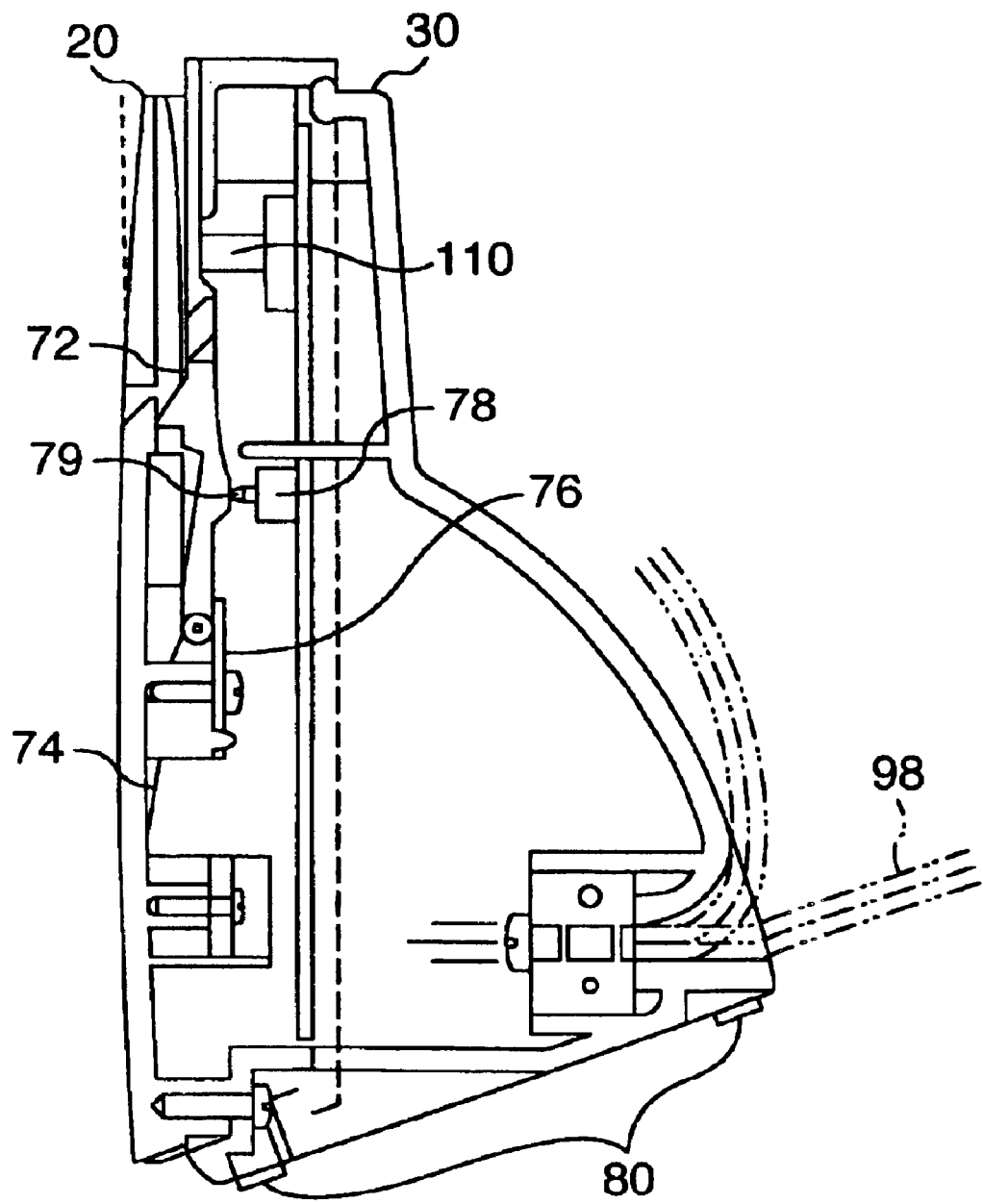
FIG. 4 is a sectional view of the information input/output unit shown in FIG. 1.
Figure 5:
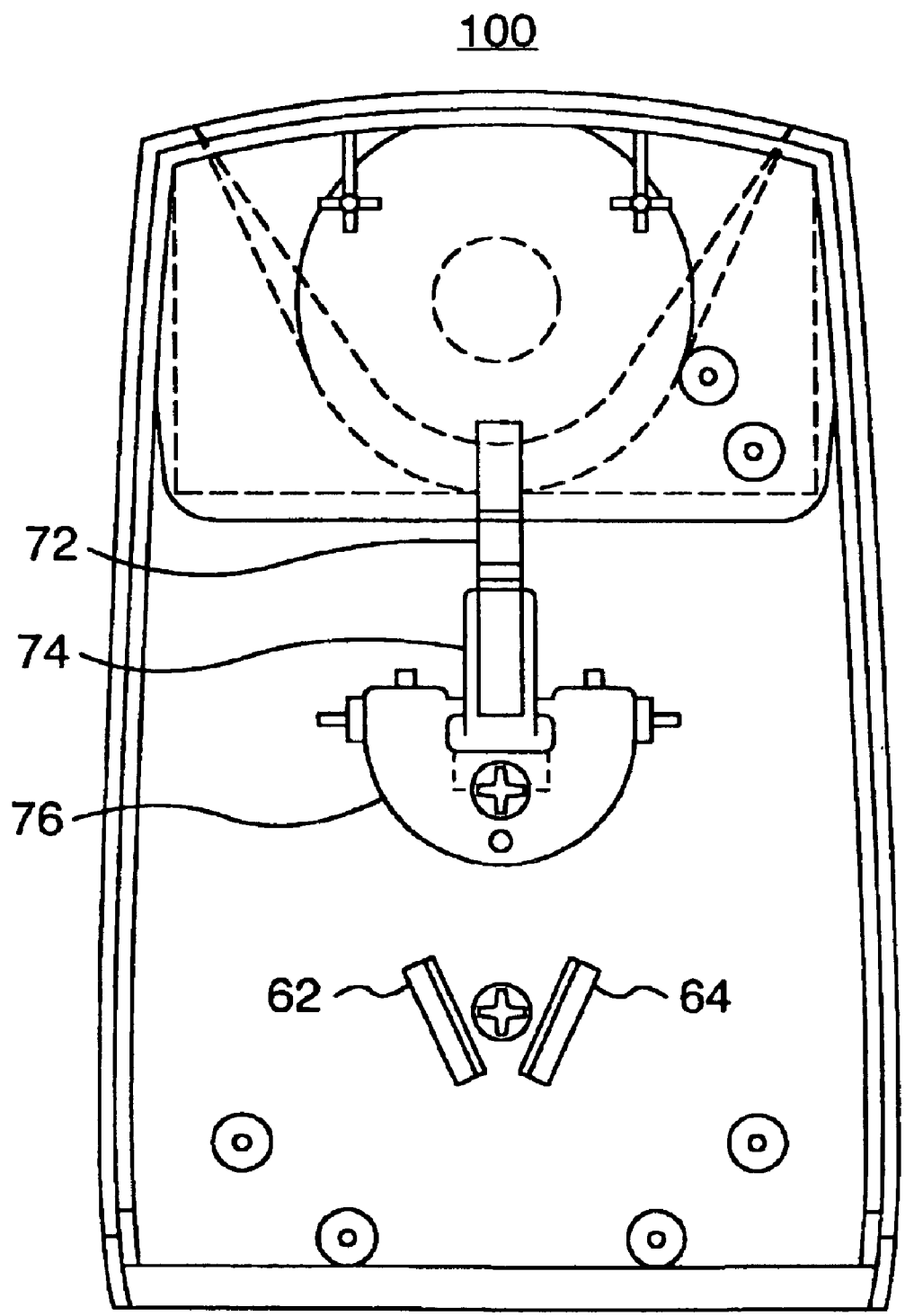
FIG. 5 is a rear side view of a back cover of the information input/output unit shown in FIG. 4.

As is shown in FIGS. 1 and 2, the reader/writer 100 is composed of a casing 10, receiving cavities 40 and 50, lamps 62 and 64, a switch 72, rubber pads 80 and a cord 98. The casing 10 may be formed of e.g. a plastic material and includes a front cover 20 and a back cover 30, as is shown in FIGS. 3 to 5, wherein there are provided e.g. four rubber pads 80 at corner portions, respectively, of the bottom. Incidentally. FIG. 2 is a front view of the reader/writer 100. FIG. 3 is a side view of the reader/writer 100. FIG. 4 is a sectional view of the reader/writer 100. FIG. 5 is a rear side view of the back cover 30 of the reader/writer 100.

As a modification, the casing 10 may be implemented integrally with a keyboard of the note-type personal computer 300 or as an extension unit thereof. Alternatively, the casing 10 may be implemented integrally with a main body or an accessory device (e.g. remote controller of a television) of other electronic apparatuses (e.g. PDA, handheld personal computer, wearable computer, television, cellular phone, game machine or the like), differing from the instant embodiment of the invention.

The front cover 20 and the back cover 30 are connected together by means of screws or other coupling members. The front cover 20 is provided with the receiving cavities 40 and 50, the lamps 62 and 64 and the switch 72, as shown in FIG. 2.

The receiving cavity 40 is adapted to be partially engaged with the noncontact IC card 202 while partially housing the same. More specifically, the receiving cavity 40 is so designed as to position the noncontact IC card 202 at a predetermined position where an antenna part 120 of the reader/writer 100 can perform communication with an IC chip 210 of the noncontact IC card 202, as will be described later on. Similarly, the receiving cavity 50 is adapted to partially engage with the noncontact IC tag 204 while partially housing the same. More specifically, the receiving cavity 50 is also so designed as to position the noncontact IC tag 204 at a predetermined position where the antenna part 120 of the reader/writer 100 can communicate with the IC chip 210 of the noncontact IC tag 204, as described later on.

As will be described hereinafter, thickness of the noncontact IC card 202 (0.76 mm in the case of the instant embodiment of the invention) is thinner than that of the noncontact IC tag 204 (1.5 mm in the case of the instant embodiment) while the area (size) of the front surface of the noncontact IC card 202 (which measures 54 mm in length and 85.6 mm in width in the case of the instant embodiment) is larger than the area (size) of the front surface of the noncontact IC tag 204 (which measures 15 mm×15 mm×in the case of the instant embodiment).

Figure 16:
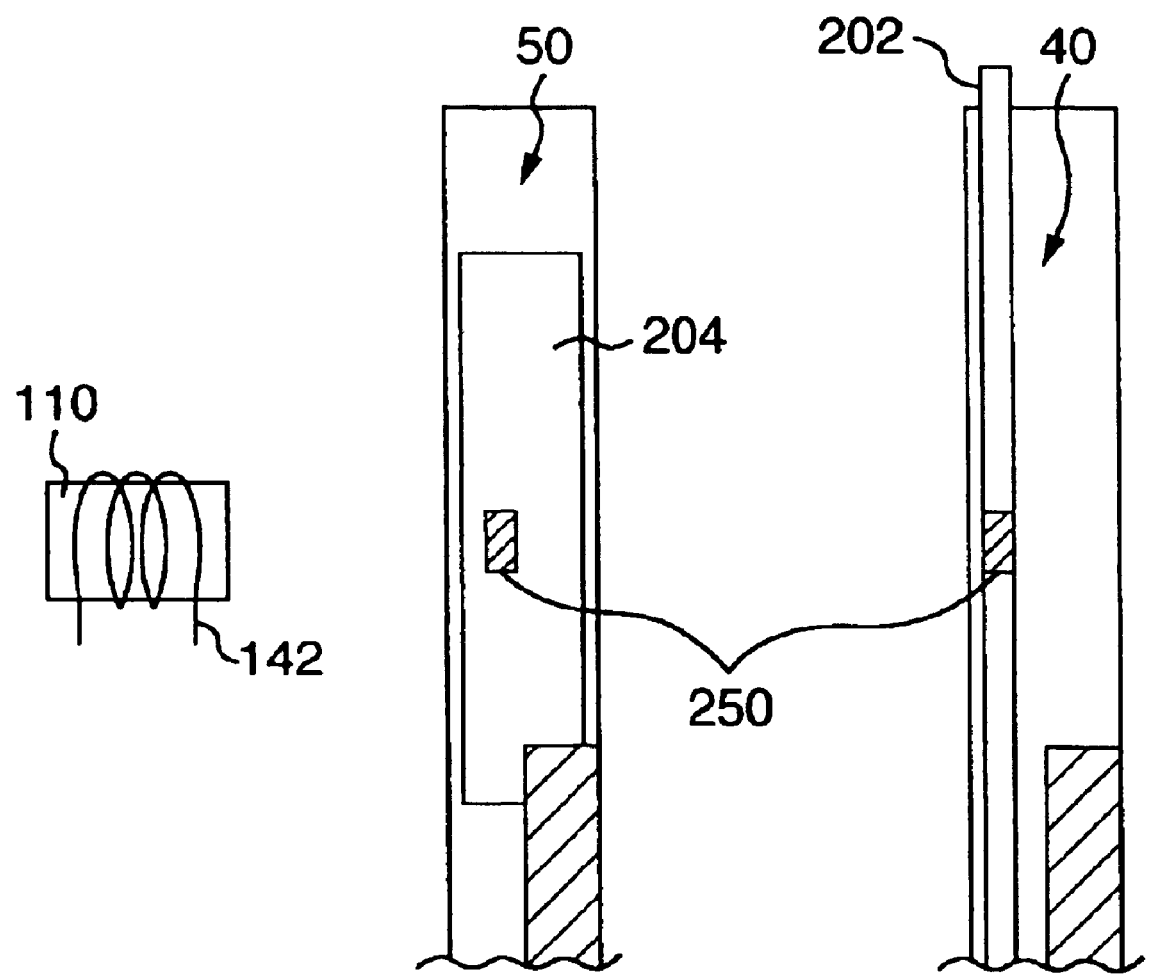
FIG. 16 shows schematic sectional views for illustrating states in which the noncontact information media are placed within receiving cavities, respectively, of the information input/output unit shown in FIG. 1.
Figure 17:
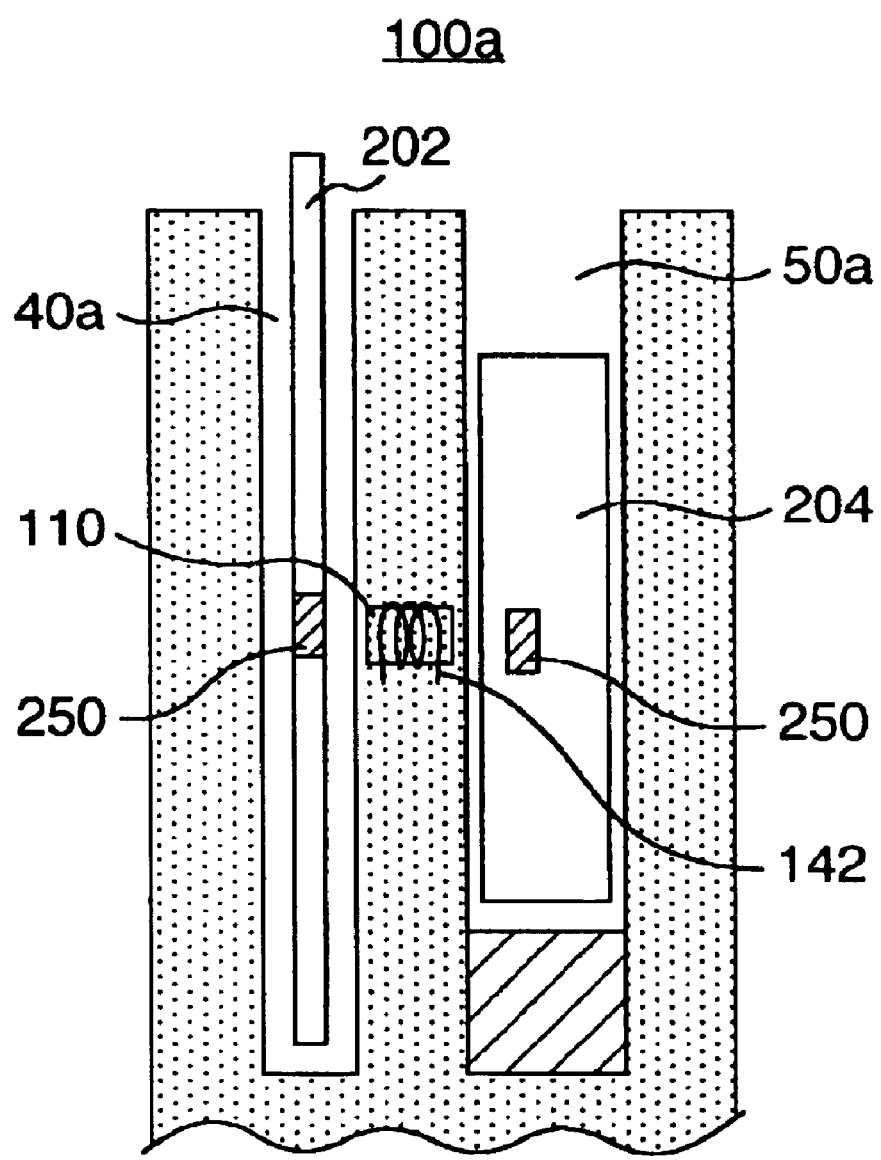
FIG. 17 is a schematic sectional view showing a modification of the information input/output unit shown in FIG. 16.

FIG. 16 shows schematically in sectional views a state in which the card 202 has been placed in the receiving cavity 40 and a state in which the noncontact IC tag 204 is placed within the receiving cavity 50. A communication module 110 of the reader/writer 100 can communicate with a coil-on IC chip 250 of the noncontact information medium 200 through the medium of an antenna 142. In the case of the structure shown in FIGS. 1 and 16, the card 202 and the tag 204 can not simultaneously be inserted into the receiving cavities 40 and 50. By contrast, FIG. 17 shows schematically in a sectional view a reader/writer 100a in which receiving cavities 40a and 50a are separated or partitioned from each other. In the case of the structure shown in FIG. 17, the communication module 110 is capable of simultaneously carrying out communication with the two types of noncontact information media 202 and 204. The reader/writer of this structure may be used with improved efficiency for effectuating e.g. electronic transaction by storing electronic money in the noncontact IC card 202 while storing in the noncontact IC tag 204 an address of a home page for making access to an internet site.

Figure 18:
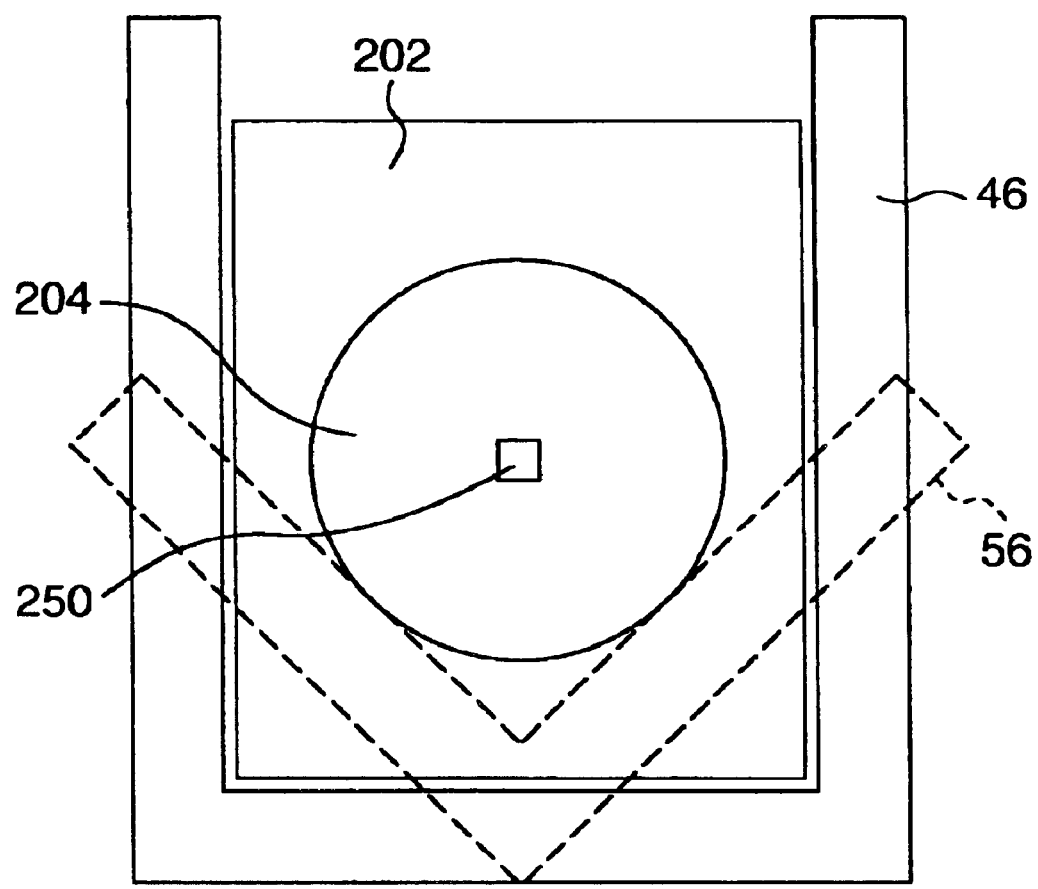
FIG. 18 is a schematic perspective plan view showing a modification of the receiving cavities formed in the information input/output unit shown in FIG. 2.

As is indicated by a dotted line in FIG. 2, the receiving cavity 40 has a contour 42 of an approximately rectangle shape in conformance with a shape of the card while the receiving cavity 50 has a contour 52 of an approximately U-like shape in conformance with the coin-like shape. As shown in FIGS. 2 and 3, the receiving cavity 50 is formed in front of the receiving cavity 40, wherein the thickness of the receiving cavity 40 is smaller than that of the receiving cavity 50. In FIG. 2, a single-dotted broken line indicates the state in which the noncontact IC tag 204 has been inserted. Of course, as a modification, the receiving cavity 40 may be realized by employing a U-like frame 46 for thereby allowing the card 202 to be received therein while the receiving cavity 50 may be composed of a V-like frame 56 to allow the tag 204 to be received therein, as shown in FIG. 18. Parenthetically, FIG. 18 is a schematic perspective plan view showing a modification of the receiving cavities 40 and 50 shown in FIG. 2.

The receiving cavities 40 and 50 has a concave-convex or corrugated surface 44 which is common in part to both the cavities. The corrugated surface 44 serves facilitate the smooth insertion and removal of the noncontact IC card 202 and the noncontact IC tag 204 into and from the reader/writer 202.

The lamps 62 and 64 are provided for indicating the state of the reader/writer 100. As a selectable modification, the reader/writer 100 may be provided with a liquid crystal panel (not shown) for displaying data of the noncontact IC card 202 and that of the noncontact IC tag 204. The lamp 62 serves for indicating whether or not the reader/writer 100 is in the operating state performing communication with the noncontact IC card 202 and the noncontact IC tag 204 while indicating at the same time whether or not operation error has taken place. The lamp 62 may be so designed as to indicate the communicating operation state and occurrence of operation error discriminatively from each other. By way of example, the lamp 62 may be lit in the course of the communicating operation while being flashed on/off upon occurrence of operation error or alternatively the lamp 62 may be lit in different colors for indicating the communicating operation and the occurrence of operation error discriminatively from each other. As a further selectable modification, the lamp 62 may be constituted by a pair of lamps, one for indicating the communicating operation and the other for indicating occurrence of an operation error. When electric power is being supplied to the reader/writer 100, the lamp 64 is lit while it is deenergized when the power supply to the reader/writer is turned off. The lamp 64 may be operated with a different color in a fashion differing from the lamp 62. Furthermore, the lamps may be replaced by a liquid crystal panel or a speaker or the like substantially to the same effect.

Referring to FIG. 5, the switch 72 cooperates with a spring 74, a retaining plate 76 and a release unit 78 to constitute a pop-up mechanism 70 (not shown). The switch 72 is designed to engage with the noncontact IC card 202 and the noncontact IC tag 204 placed in the receiving cavities 40 and 50, respectively, to move downwardly against the spring force of the spring 74 secured fixedly to the front cover 20 through the medium of the retaining plate 76 to a position indicated by a broken line in FIG. 4 to thereby press a projection 79 of the release unit 78. As a result of this, the reader/writer 100 can detect insertion of the noncontact IC card 202 or the noncontact IC tag 204. After communication for data exchange or transaction, the projection 79 of the release unit 78 springs out to cause the switch 72 to resume the original position. At the same time, the switch 72 moves upwardly under the urgency of the spring 74 to force the noncontact IC card 202 or the noncontact IC tag 204 to project outwardly so that it can easily be taken out.

Figure 19:
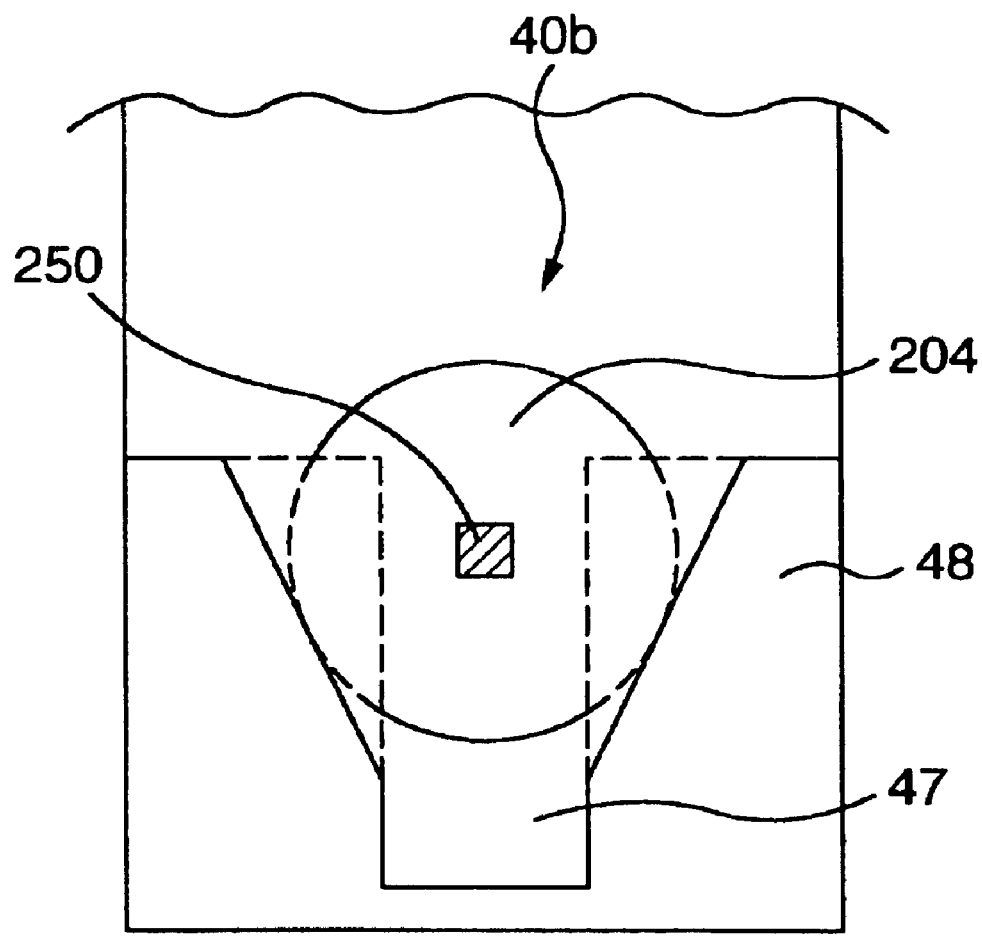
FIG. 19 is a schematic perspective plan view showing another modification of the receiving cavity formed in the information input/output unit shown in FIG. 2.
Figure 20:
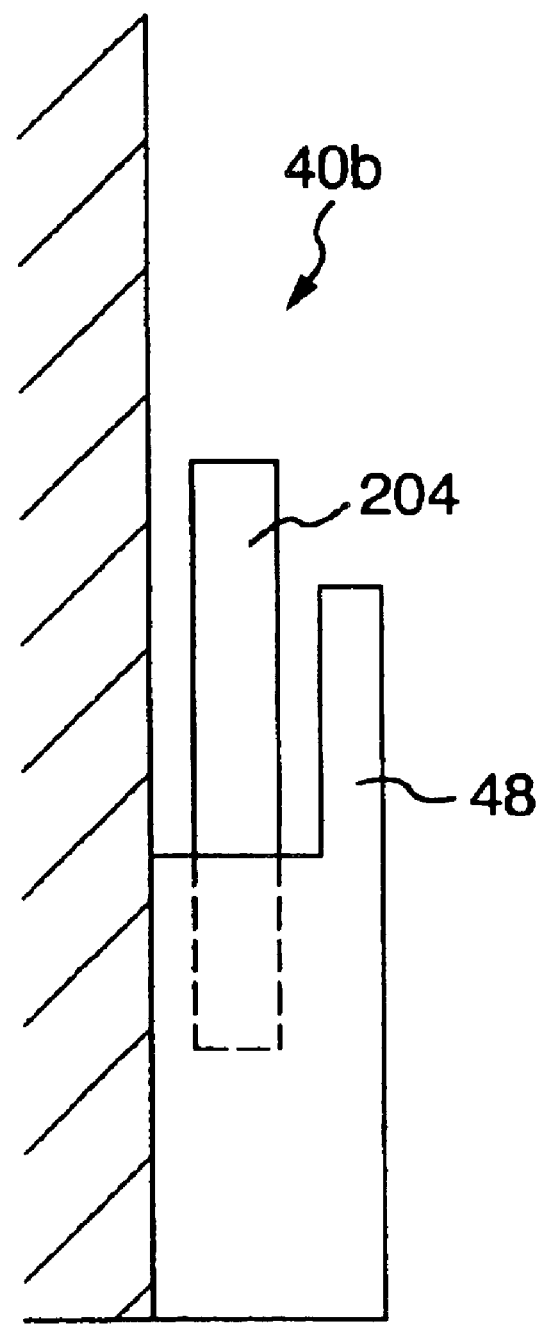
FIG. 20 is a schematic sectional view of the receiving cavity shown in FIG. 19.

In an alternative embodiment of the invention, a notch 47 may be formed in a retaining plate 48 which supports the noncontact IC tag 204 (the noncontact IC card 202 is omitted from illustration because the same holds true for this card), wherein a finger may be inserted in the notch 47 for placing the noncontact IC tag 204 within a receiving cavity 40b and removing it from the receiving cavity 40b, as shown in FIGS. 19 and 20. Parenthetically, FIG. 19 is a schematic perspective plan view showing the receiving cavity 40b as a modification of the receiving cavity 40, and FIG. 20 is a sectional view of the receiving cavity 40b.

The cord 98 is implemented as a USB cord in the case of the instant embodiment. However, the cord may be constituted by an RS232C cord or other. It goes without saying that the cord 98 (and the connector) will have to be changed in dependence on the electronic equipment or accessory apparatus thereof as used.

Figure 6:
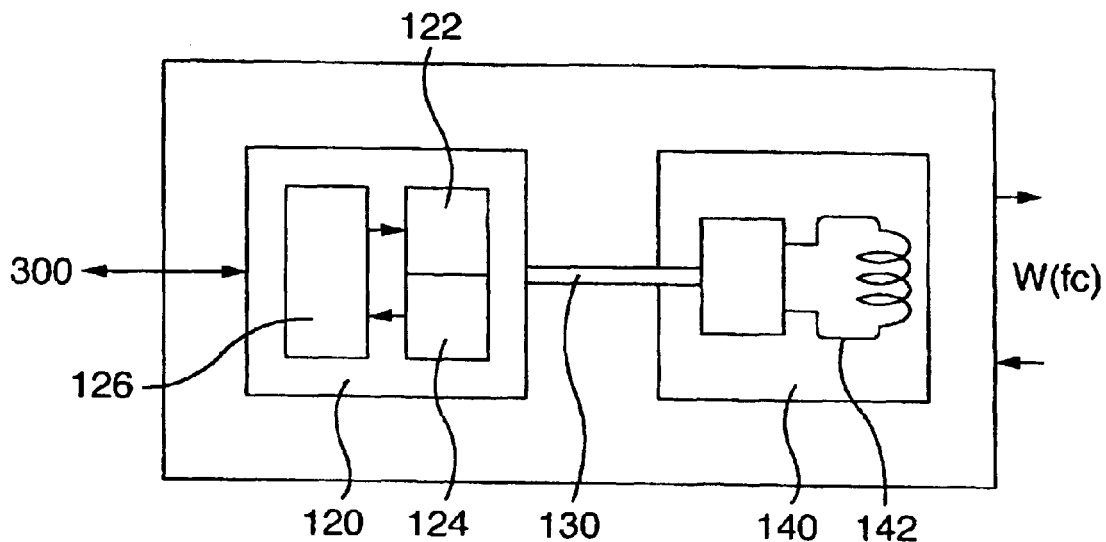
FIG. 6 is a schematic block diagram showing generally an arrangement of a communication module shown in FIG. 4.
Figure 7:
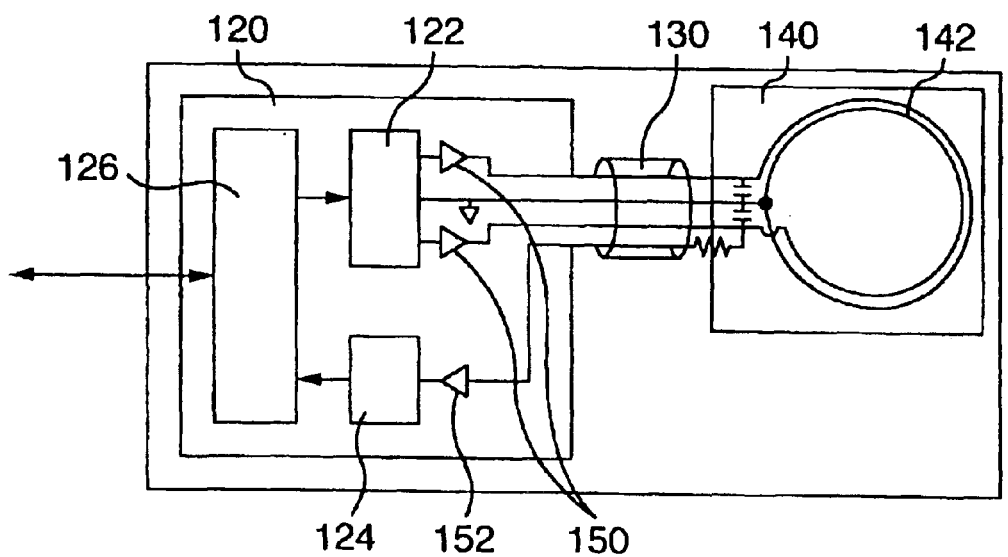
FIG. 7 is a block diagram showing in more concrete a structure of the communication module shown in FIG. 6.

The reader/writer 100 includes a communication module 110, as shown in FIGS. 4, 6 and 7. At this juncture, FIG. 6 is a schematic block diagram showing generally an arrangement of the communication module 110, and FIG. 7 is a block diagram showing in more concrete a structure of the communication module 110.

As shown in FIG. 6, the communication module 110 includes a control interface part 120 and an antenna part 140 which are interconnected via a cable 130. The communication module 110 is designed to send to and receive from the noncontact information medium 200 a radio wave W having a carrier frequency fc for communication with the noncontact information medium 200 by radio. For the radio wave W, a carrier frequency fc of a given frequency band (e.g. 13.56 MHz) can be used. The communication module 110 is connected to the note-type personal computer 300 through the medium of the control interface part 120. However, the communication module 110 may be connected to other electronic apparatus (such as desk-top personal computer, PAD or the like) instead of connection to the note-type personal computer 300.

The control interface part 120 incorporates therein a transmission circuit (modulation circuit) 122, a reception circuit (demodulation circuit) 124 and a controller 126. The transmission circuit 122 is designed to modulate data supplied from the note-type personal computer 300 by making use of the carrier frequency fc to thereby convert the data into a transmission signal which is then fed to the antenna part 140. For the modulation to this end, any appropriate modulation scheme available in the art may be adopted.

In the reception circuit 124, the signal received from the noncontact information medium by way of the antenna part 140 is converted to a base band signal to thereby derive data which is then sent to the note-type personal computer 300. In practical applications, the transmission circuit 122 and the reception circuit 124 are connected to a plurality of driving circuits 150 and 152 to be driven thereby, as is shown in FIG. 7. Incidentally, since those skilled in the art can easily understand and implement the structures and operations of the transmission circuit 122, the reception circuit 124 and the driving circuits 150 and 152, detailed description thereof will be unnecessary.

Next, referring to FIGS. 8 and 9, description will be made of the noncontact IC card 202 which is incarnated, by way of example only, as an ID card. In this conjunction, FIG. 8 is a schematic plan view showing generally the noncontact IC card 202, and FIG. 9 is an enlarged sectional view of the noncontact IC card 202.

The noncontact IC card 202 carries individual identification information 212 or the like ("individual" is not to be interpreted as being restricted to human beings but should be construed as encompassing animals, plants, buildings, manufactured goods or the like) and invisible information (e.g. invisible bar code 220), and promises various multi-purpose applications which cover financial applications (cashing card, credit card, electronic money managing medium, firm banking, home banking or the like), commercial distribution applications (shopping card, prepaid card, point card, merchandise bond or the like), various types of membership cards (for hotel, airline company, golf field, restaurant or the like), medical applications (consultation ticket, health insurance card, blood donor card, health note, medical card storing health information or the like), traffic applications (stored fair (SF) card, coupon ticket, license, commuter's ticket, airline ticket, highway card, parking card, passport or the like), insurance applications (insurance policy or the like), bond applications (bond or the like), education applications (student's identification card, achievement certificate or the like), certificates of various memberships and enterprises (certificate of staff, permit ID card for access to depository or the like), administration applications (certificate of one's seal impression, tax payment card, resident card or the like) and so forth.

Figure 8:
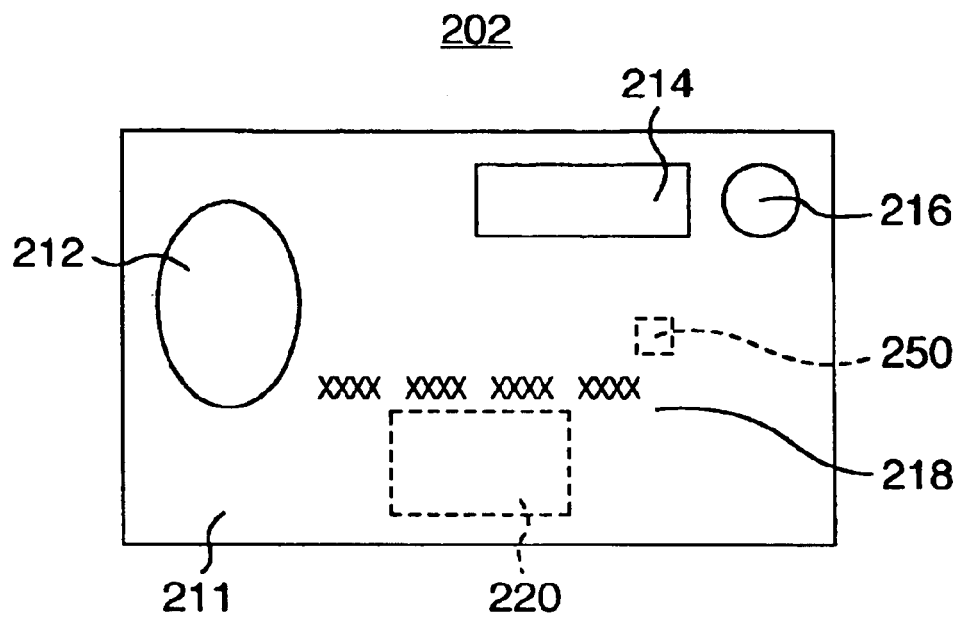
FIG. 8 is a schematic plan view showing generally a noncontact IC card as an example of the noncontact information medium shown in FIG. 1.
Figure 9:
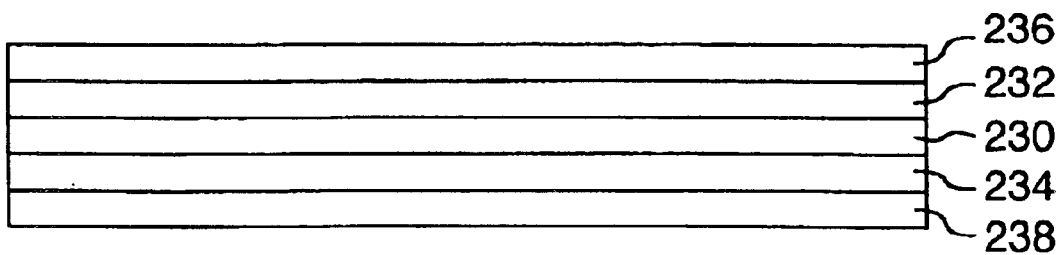
FIG. 9 is an enlarged sectional view of the noncontact IC card shown in FIG. 8.

Referring to FIG. 8, the noncontact IC card 202 includes, by way of example, a substrate pattern 211, a face photograph 212, card issuer information 214, a card issuer logo mark 216, an ID number 218, an invisible bar code 220 and a coil-on IC chip 250. The noncontact IC card 202 has same dimensions as the credit card, a so-called ISO (International Organization for Standardization) size (54 mm in length, 85.6 mm in width and 0.76 mm in thickness). However, the shape and the size of the noncontact IC card is not restricted to the ISO size but may have a given shape (e.g. pendant-like shape, coin-like shape, key-like shape, tag-like shape or the like) in dependence on the intended or described application (s). Further, the components 211 to 218 shown in FIG. 8 may be implemented in white, black or any color.

The substrate pattern 211 may be constituted by a desired pattern such as a photograph, picture or animation or alternatively may be implemented patternless. The face photograph 212 and identification number 218 (membership number, credit card number or the like) do not always represent the indispensable component items. The card issuer information 214 may be e.g. hotel name, airline company name, credit card company name, school name or the like, and the card issuer logo mark 216 may be a logo mark or the like of an airline company, etc. The card issuer information 214 may include the status of the card (gold membership, platinum membership or the like) and additionally contain a related company (e.g. associate credit company, associate airline company, associate hotel or the like), as the case may be. Besides, the noncontact IC card 202 may carry information concerning the term of validity of the card and/or other marks (hologram, sign panel, carved stamp, hot stamp, image print or the like) as occasion requires. The ID number 218 of the card according to the instant embodiment of the invention is formed by printing instead of embossing although it is not intended that the embossment be excluded from the information medium according to the present invention.

The invisible bar code 220 is printed with a phosphor material and affixed ordinarily with a serial number or a unique number which differs from one to another card in the case of the instant embodiment. At this juncture, it should however be mentioned that the invisible bar code 220 may be replaced by other invisible information such as a mark, a string of characters or symbols or the like, as the case may be. The phosphor material becomes excited upon exposure to energy such as of light, electrons, etc., while emitting energy upon restoration to the ground state. In the card according to the present invention, any one of phosphors which is susceptible to excitation and luminescence with ultraviolet ray, infrared ray or visible light rays can be employed. However, in the case of the instant embodiment now under consideration, it is presumed, only by way of example, that phosphor which can undergo excitation with infrared ray invisible with the eye of the user and which can emit the infrared ray upon restoration to the ground state.

Light ray of long wavelength such infrared ray is likely to transit through printed matters and films. Accordingly, even when a printed layer is applied over the invisible bar code 220, the luminescence intensity will scarcely lower. However, in the case where an infrared-ray absorbing printed matter such as of carbon is disposed on the invisible bar code 220, infrared rays will be absorbed. Accordingly, it is preferred to dispose the printed matter which does not absorb infrared rays.

Figure 10:
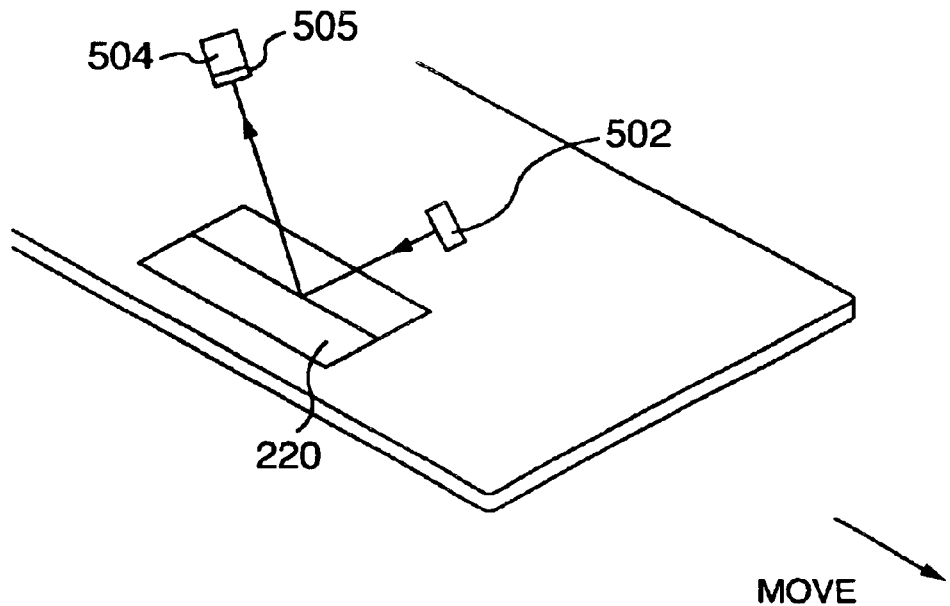
FIG. 10 is a schematic perspective view for illustrating the principle of reading an invisible bar code on the noncontact IC card shown in FIG. 8.
Figure 11:
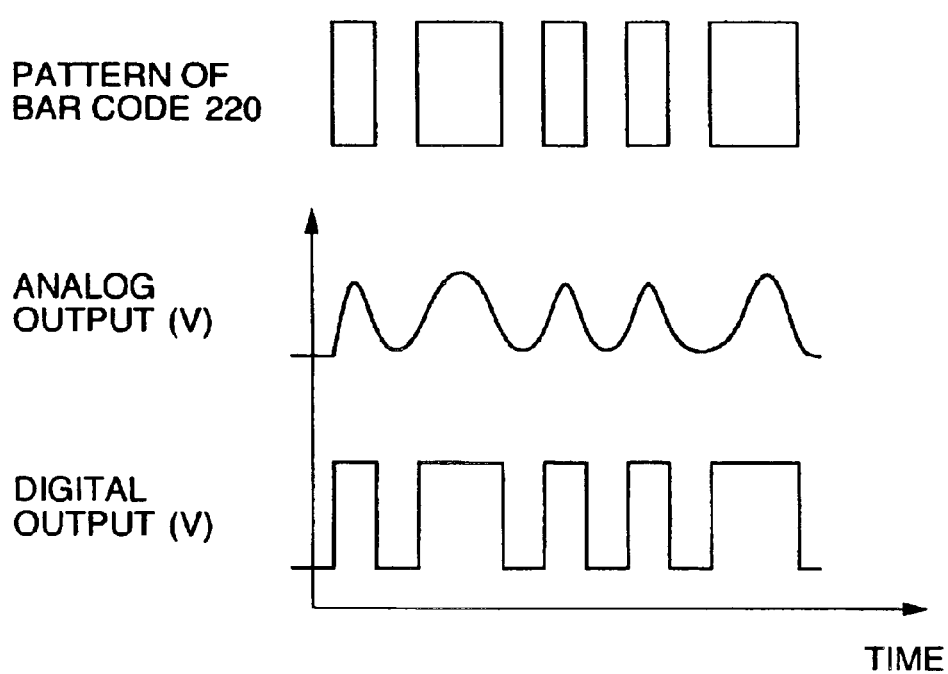
FIG. 11 is a chart for illustrating, by way of example, signals representing the invisible bar code as read.

Next, referring to FIGS. 10 and 11, the principle of reading the invisible bar code 220 will be described. In this conjunction, FIG. 10 is a schematic perspective view for illustrating the principle of reading the invisible bar code 220. FIG. 11 is a chart for illustrating, by way of example, of the signals originating in the invisible bar code 220 as read. As is shown in FIG. 10, the invisible bar code 220 can be detected by means of a detector 504 which may be constituted by a photodiode through cooperation with a light source 502 such as a LED. When the invisible bar code 220 is irradiated with excitation light rays emitted from the light source 502, these portions of the invisible bar code formed of phosphor emit light rays. However, at the portions of the invisible bar code applied with no phosphor, the excitation light rays are reflected. The reflection light rays are cut off by an optical filter 505 disposed in front of the detector 504. Thus, only the fluorescent rays are detected by the detector. By moving the invisible bar code 220 in the direction indicated by an arrow, a signal corresponding to the bar code can be obtained in the form of an analogue output signal from the detector 504. The analogue output signal is then converted to a digital output signal by an A/D converter connected to the detector 504 although illustration of the A/D converter is omitted. In this way, the bar code information can be read.

The invisible bar code 220 facilitates management of the noncontact IC card 202. The management may include, for example, management for issuance of the noncontact IC cards 202 by printing or punching and delivery thereof to customers, management for reissuance of new card for defective card 202 of which use is disabled, collative management of printed contents upon magnetic encoding or IC encoding for magnetic card or IC card which is to constitute the card 202. The invisible bar code 220 does not injure the aesthetic appearance of the substrate pattern 211 because the presence of the invisible bar code 220 is not externally perceptible. Additionally, by virtue of the feature that the presence of the bar code can not visibly be recognized, the leakage of bar code information is difficult to occur, whereby the security of the card 202 can be enhanced.

Next, referring to FIG. 9, description will be made of an exemplary structure of the card 202. The noncontact IC card 202 includes a substrate 230, printed layers 232 and 234 and protecting layers 236 and 238, respectively. The substrate 230 may be formed of, for example, vinyl chloride, plastic or polyester sheet. Further, there may be disposed on the substrate 230 a display and a keyboard not shown for thereby making it possible to realize a further increased number of functions. The substrate 230 is equipped with the coil-on IC chip 250. In that case, the IC chip 250 can store therein the information concerning the invisible bar code 220.

The printed layer 232 includes the components 211 to 220 shown in FIG. 8. In a selectable modification, the substrate pattern 211 and the other components 212 to 220 may be formed as the discrete printed layers, respectively. More specifically, as for the printed layer 232, the ID information and the invisible bar code 220 are formed in the same printed layer. Heretofore, the ID information and the invisible bar code 220 are formed as the separate printed layers, respectively, as a result of which there has been arisen a fear of e.g. the face photograph 212 being substituted fraudulently by laminating the top layer. However, the printed layer 232 according to the present invention solves the problem mentioned above and ensures enhanced security for the card 202.

The printed layer 234 which can selectively be provided is printed on the back surface of the substrate 230 in the form of e.g. a magnetic stripe in which the information concerning the invisible bar code 220 can be stored. At this juncture, it should be mentioned that the phrase "information concerning the invisible bar code 220" is used in the sense to conceptually cover the bar code information (e.g. ID code or the like) and the information correspondent to the bar code (e.g. address, name, age, date of birth, physical features or the like).

The printed layers 232 and 234 are formed of a toner, ink or other sort of developer. The toner may be magnetic or nonmagnetic and may contain one component or two components (inclusive of carrier). The ink may contain solvent, colorant, oxide, binder, lubricant and additionally or alternatively other component(s). The ink for printing the ID information and the ink for printing the invisible bar code 220 differ from each other in respect to presence/absence of a coloring agent and other compositions. As the protecting layers 236 and 238, there may be employed, for example, vinyl chloride over-film, polyester over-film or the like.

Figure 12:
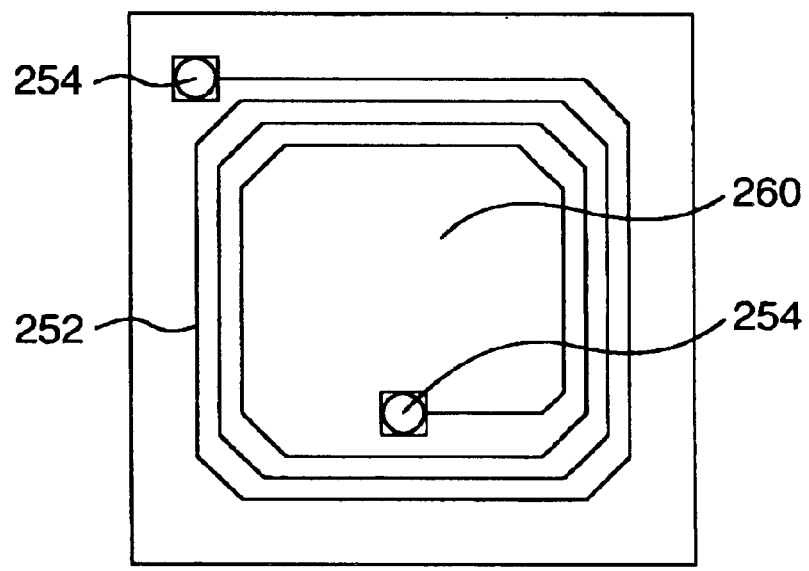
FIG. 12 is a schematic perspective plan view showing a coil-on IC chip employed in the noncontact information medium shown in FIG. 1.

Now referring to FIG. 12, description will be made of the coil-on IC chip 250. In this conjunction, it should first be mentioned that the coil-on IC chip 250 is positioned with equidistance from the front and back surfaces and a distance of 15 mm from the right-hand side as viewed in FIG. 8. As shown in FIG. 12, the coil-on IC chip 250 is composed of a substrate serving as a supporting member, an IC module 260 which is a semiconductor chip mounted on the substrate and an on-chip coil 252 formed on the surface of the IC module 260 by plating. The IC module 260 and the on-chip coil 252 are electrically connected to each other at terminals 254. Incidentally, FIG. 12 is a schematic perspective plan view of the coil-on IC chip 250.

Figure 13:
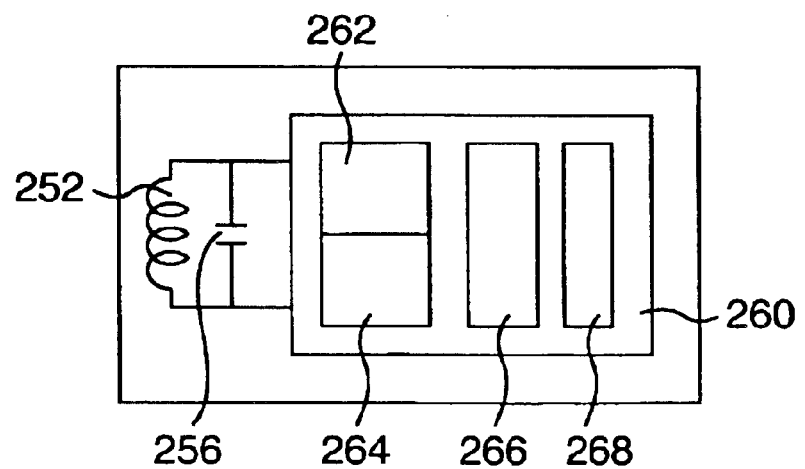
FIG. 13 is a block diagram showing conceptually a structure of the coil-on IC chip shown in FIG. 12.

Conceptually, the coil-on IC chip 250 includes the antenna coil 252 and the IC module 260, as can be seen in FIG. 13. Incidentally, FIG. 13 is a schematic block diagram showing a structure of the coil-on IC chip 250. The coil 252 can perform wireless or radio communication with the reader/writer 100.

Figure 24:
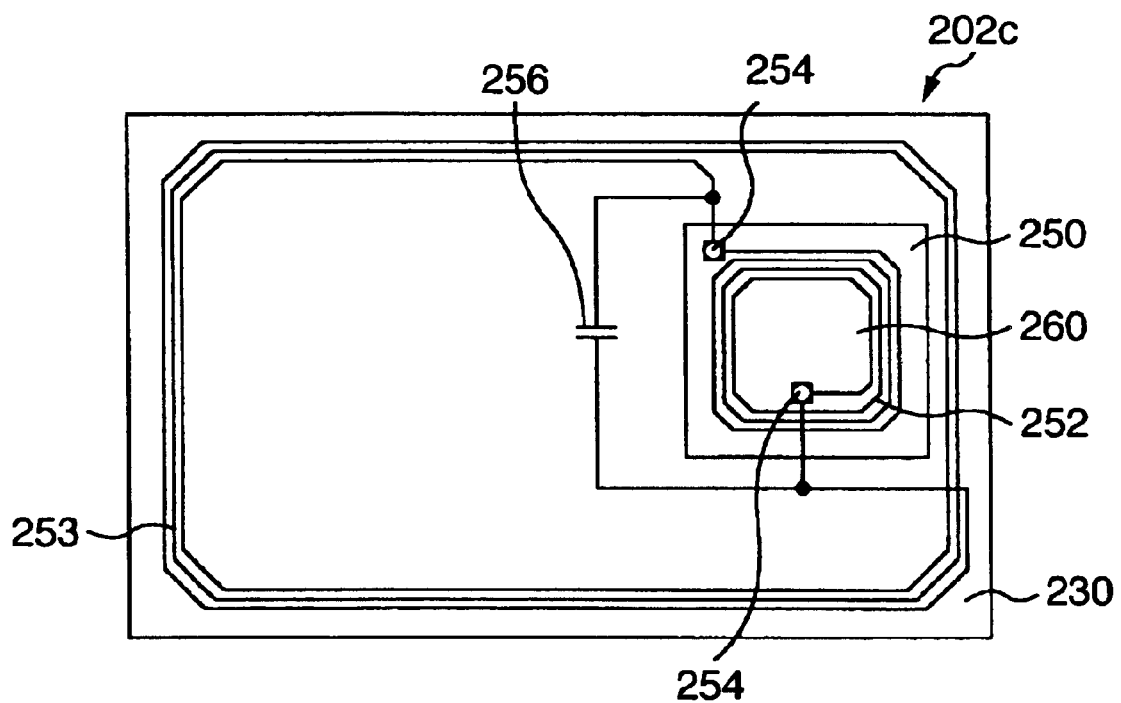
FIG. 24 is a schematic plan view showing a modification of the coil-on IC chip shown in FIG. 12.

A resonance capacitor 256 has electrostatic capacity C and cooperates with inductance L of the coil pattern 252 to form a resonance circuit which can resonate with the carrier frequency fc of the radio wave for transmission/reception. Since the resonance frequency $f_r$ is given by $f_r = (1/2\pi)(LC)^{-1/2}$, it is possible to cause a large resonance current to flow through the coil 252 and the capacitor 256 by making the resonance frequency coincide with the carrier frequency fc, wherein the resonance current can be fed to the IC module 260. The capacitor 256 may be formed in a same plane as the IC module 260 (i.e., in a single layer) or alternatively in a multi-layer structure. By way of example, the coil 253 and the capacitor 256 may be connected to pads 254 with a view to increasing the communication range of the coil-on IC chip 250, as shown in FIG. 24. Incidentally, FIG. 24 is a schematic plan view of the coil-on IC chip 250 including the coil 253 and shown in FIG. 12.

Figure 14:
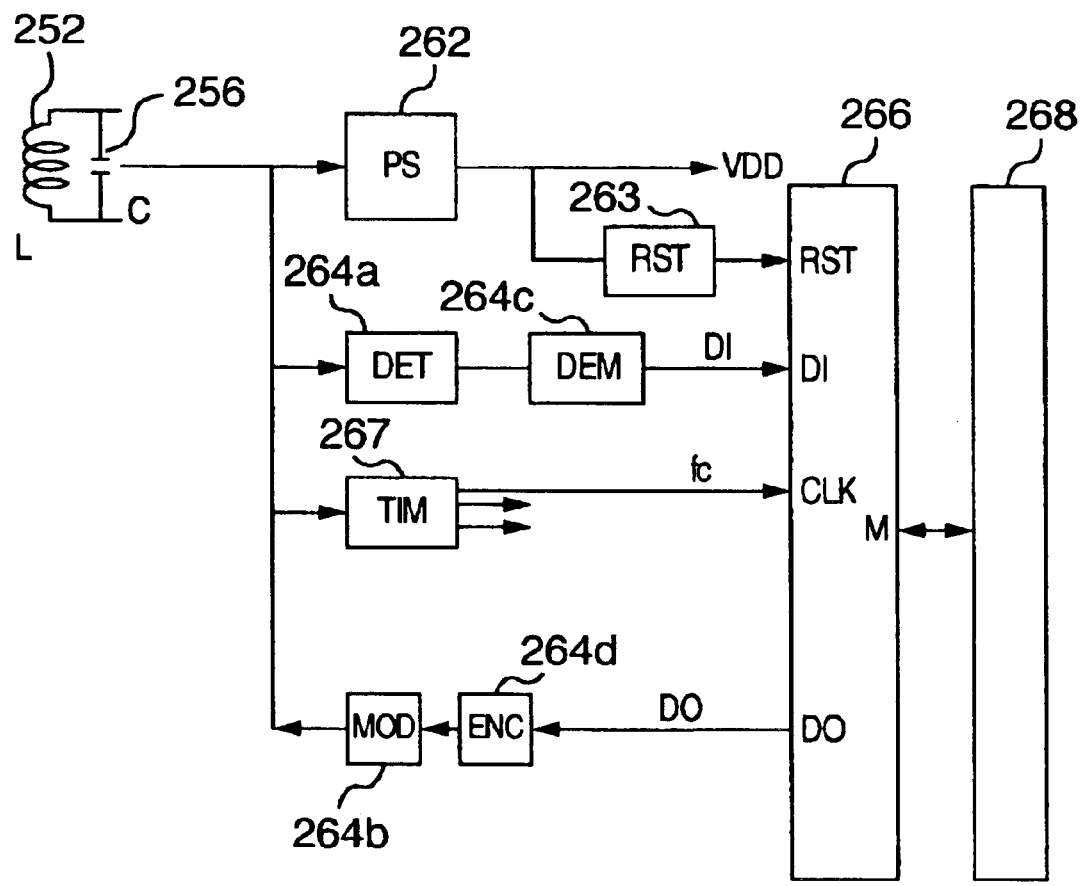
FIG. 14 is a block diagram showing in more detail individual constituent module of the coil-on chip shown in FIG. 13.

FIG. 14 is a block diagram showing in detail individual components of the IC module 260. The IC module 260 is comprised of a power supply circuit 262, a reset signal generating circuit 263, a transmitter/receiver circuit 264 (i.e., circuitries 264a to 264d), a logic control circuit 266, a timing circuit (TIM) 267 and a memory 268. The IC module 260 is capable of communicating with the reader/writer 100 through the medium of the coil 252.

Connected to the power supply circuit (PS) 262 is the reset signal generating circuit 263 which in turn is connected to the reset terminal (RST) of the logic control circuit 266. The IC module 260 is designed to supply the operating voltage Vcc (e.g. 5 V) of the communication system to the logic control circuit 266, which voltage is derived through electromagnetic induction from the radio wave W (carrier frequency fc) received from the reader/writer 100. In response to generation of the operating voltage Vcc, the reset signal generating circuit 263 resets the logic control circuit 266 for making preparation for a succeeding or fresh operation.

The transmitter/receiver circuit 264 includes a detector (DET) 264a, a modulator (MOD) 264b, a demodulator (DEM) 264c and an encoder (ENC) 264d. The demodulator 264c and the encoder 264d are connected to data terminals DI and DO, respectively, of the logic control circuit 266. A decoder composed of a D/A converter or the like may be disposed as an independent component in a stage succeeding to the demodulator 264c, as occasion requires. In that case, the decoder may be so arranged as to constitute a codec circuit in cooperation with the encoder 264d. The timing circuit 267 is used for generating a variety of timing signals and connected to a clock terminal (CLK) of the logic control circuit 266.

The receiver circuitry of the transmitter/receiver circuit 264 is constituted by the detector 264a and the demodulator 264c. The received radio wave W is detected by the detector 264a, whereon the demodulator 264c reconstructs a base-band signal from the detected signal for deriving the data. The reconstructed base-band signal (or signal reconstructed succeedingly as the case may be) is sent to the logic control circuit 266 as a data signal DI.

The transmitter circuitry of the transmitter/receiver circuit 264 is composed of the modulator 264b and the encoder 264d each of which may be implemented in any given structure known in the art. For sending the data, the carrier is modulated in conformance with the data to be transmitted and then sent to the coil 252. As the modulation scheme, an ASK for modulating the amplitude of the carrier frequency signal, a PSK for modulating the phase or the like may be adopted. Moreover, a load modulation may equally be adopted. With the load modulation, it is intended to mean the modulation of a medium power (load) in conformance with the subcarrier. The encoder 264d encodes (bit encoding) the data DO to be transmitted with a predetermined code (e.g. Manchester code, PSK code, etc.), whereon the encoded data is fed to the coil 252.

Figure 23:
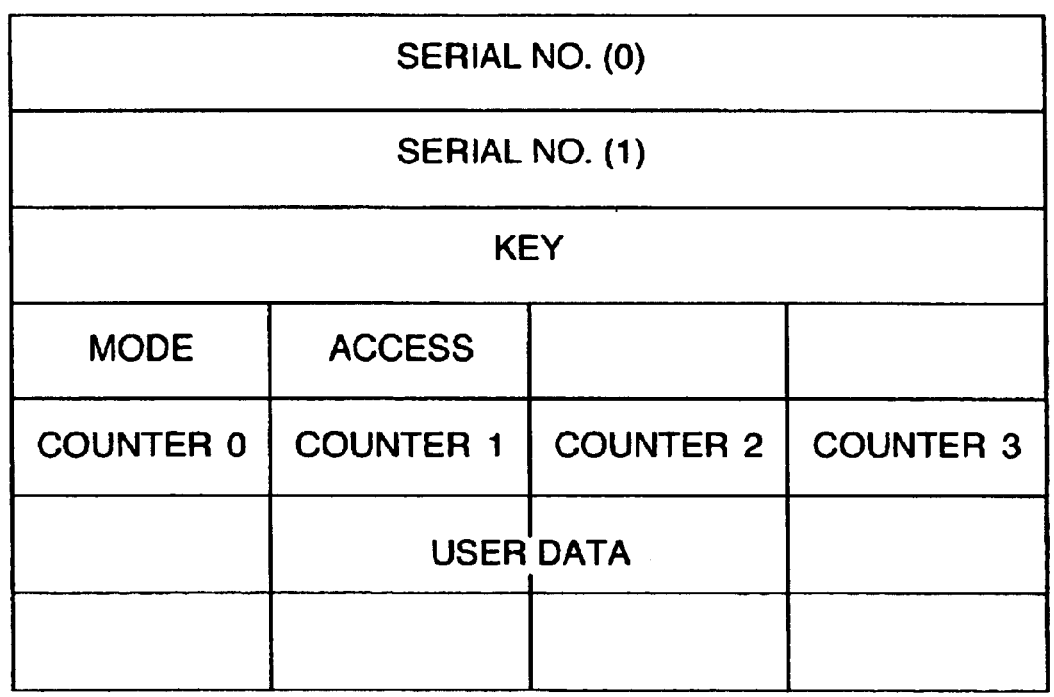
FIG. 23 is a block diagram showing an exemplary structure of a memory of the IC module shown in FIG. 14.

The transmitter/receiver circuit 264 is controlled by the logic control circuit 266 so as to operate in synchronism with the timing signal (clock) generated by the timing circuit 267. The logic control circuit 266 may be realized by a CPU. The memory 268 is composed of a ROM, a RAM, an EEPROM and/or a FRAM, etc., for example, in a structure shown in FIG. 23. Incidentally, FIG. 23 is a block diagram showing an exemplary structure of the memory 268. The logic control circuit 266 is designed to be capable of communicating with the reader/writer 100 or executing predetermined processing (s) on the basis of the data mentioned above. By way of example, the ID information, value such as electronic money of a predetermined amount, transaction records, etc. may be stored in the memory 268, while the logic control circuit 266 may be so designed as to be capable of increasing/decreasing the value mentioned above in dependence on predetermined transactions (e.g. purchase of ticket, receipt/payment of electronic money or the like). Incidentally, arrangements and operations of the components mentioned above can easily be understood by those skilled in the art. Accordingly, any further detailed description will be unnecessary.

Figure 15:
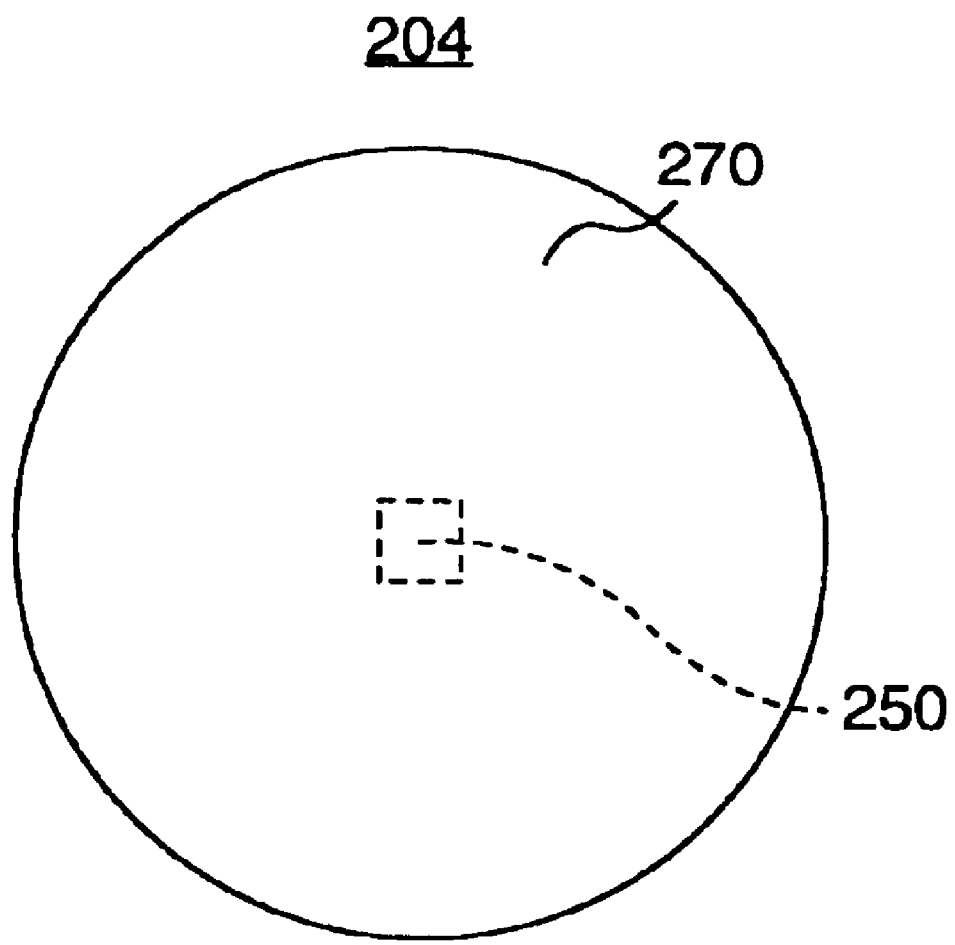
FIG. 15 is a schematic plan view showing generally a noncontact IC tag as another example of the noncontact information medium shown in FIG. 1.

The noncontact IC tag 204 is implemented with a diameter of 30 mm and a thickness of 1.5 mm, wherein the coil-on IC chip 250 is disposed at the center of the noncontact IC tag. Accordingly, the distance from the periphery of the coil-on IC chip 250 shown in FIG. 15 is 15 mm, as in the case of the distance of the coil-on IC chip 250 from the right-hand side of the noncontact IC card shown in FIG. 8. Consequently, when the noncontact information media 200 shown in FIG. 8 and FIG. 15 are placed in the receiving cavities 40 and 50, respectively, the coil-on IC chips 250 of both the information media substantially overlap with each other. The communication module 110 incorporated in the reader/writer 100 is disposed at the position capable of communicating with these coil-on IC chips 250. Incidentally, FIG. 15 is a plan view of the noncontact IC tag 204.

In the coil-on IC chip 250 shown in FIG. 15, the antenna 252 is implemented in a small size. Accordingly, the size of the card and the tag is not restricted by the shape of the coil, differing from the conventional noncontact card known heretofore. Thus, the size of a substrate 270 of the noncontact IC tag 204 can be miniaturized, which in turn means that the substrate 270 can be realized in a desired shape such as ellipse, rhombus, heart shape or the like without being limited to the circular (cylindrical) shape as in the case of the instant embodiment of the invention. In general, in the case where the reader/writer 100 is employed as the extension unit of the electronic apparatus or equipment, the shape of the noncontact IC tag 204 is subjected to no restriction. In the extension unit for the note-type personal computer 300, the memory 262 of the coil-on IC chip 250 can store therein home page addresses of enterprises for the purpose of e.g. advertisement, software program(s), game(s) and interim and/or final results of predetermined processing(s).

Figure 21:
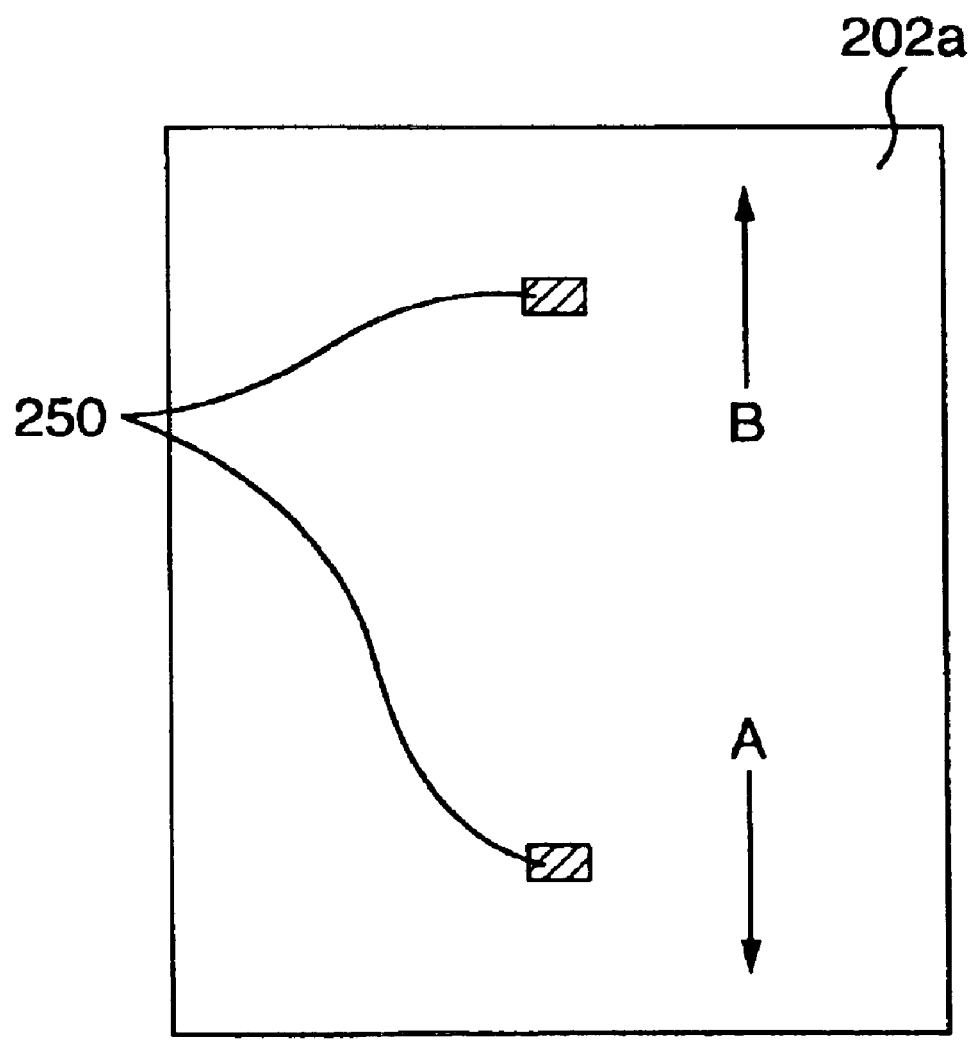
FIG. 21 is a schematic plan view showing a modification of the noncontact IC card as another example of the noncontact information medium shown in FIG. 1.
Figure 22:
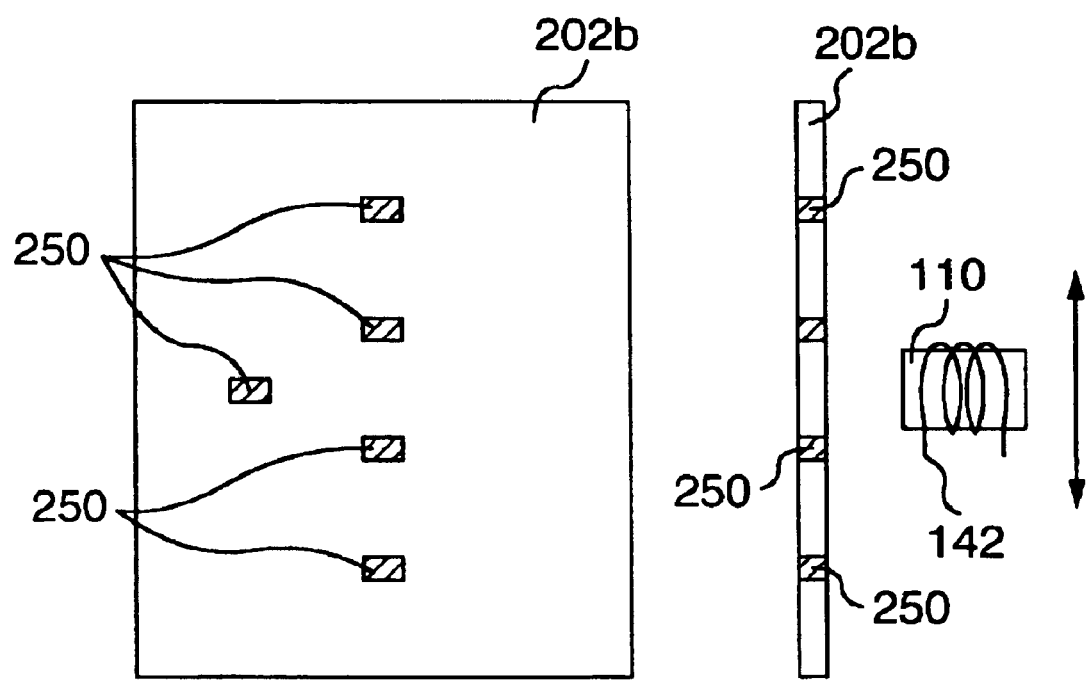
FIG. 22 is a schematic plan view showing another modification of the noncontact IC card as yet another example of the noncontact information medium shown in FIG. 1.

The noncontact information medium 200 may include a plurality of coil-on IC chips 250. By way of example, referring to FIG. 21 and FIG. 22, the noncontact IC card 202 may be substituted by noncontact IC cards 202a and 202b each equipped with a plurality of coil-on IC chips 250. Incidentally, FIG. 21 is a schematic plan view showing a modification of the noncontact IC card 202. FIG. 22 is a schematic plan view showing another modification of the noncontact IC card 202. Since each of the coil-on IC chips 250 included in the noncontact IC cards 202a and 202b, respectively, has a short communication range, there arises essentially no problem of cross-talk.

The noncontact IC card 202a includes a pair of coil-on IC chips 250 which are capable of storing different information In the respective memories 268. By way of example, the information concerning the electronic money may be stored in the upper coil-on IC chip 250 while the information concerning the credit may be stored in the lower coil-on IC chip 250. In this case, by placing the card 202a in the receiving cavity 50 in a direction A or B, the communication module 110 can perform communication with the desired one of the coil-on IC chips 250. On the other hand, in order to enable communication with the desired coil-on IC chip 250 in the case of the noncontact IC card 202b, the communication module 110 may be implemented to be movable, by way of example. Parenthetically, it goes without saying that similar modification can be made for the noncontact IC tag 204 as well.

In the following, description will be made of operation of the reader/writer 100. It is assumed, by way of example, that the noncontact information medium 200 stores the ID information (password) in the memory 268 thereof. In that case, the reader/writer 100 can be employed as the access management unit for a computer database installed in a company, institute, university, etc.

In that case, the user first inserts his or her noncontact information medium 200 in the reader/writer 100. In response, the reader/writer 100 sends out the radio wave W of the carrier frequency fc, prompting the noncontact information medium 200 to send back the ID number. The radio wave W mentioned above is preferably received by the coil 252 (and selectively by the coil 253) which resonates with the carrier frequency fc. As a result of this, an induced current flows through in the coil 252 to be fed to the IC 260. Since the induced current is an alternating current, the induced current is converted to a direct current in the power supply circuit 262, from which operating constant voltages for the individual components can be derived.

On the other hand, the control module 266 responds to the signal (induced current) supplied via the coil 252 and the demodulating circuit not shown to thereby cause the individual components to operate such that the ID information (password or the like) is read out from the memory 268 to be subsequently sent out from the coil 252. In this manner, the ID information is read out from the memory 268 to be sent externally by way of the transmitter/receiver circuit 264 and the coil 252. The ID information emanated from the coil 252 is transferred to the antenna part 140 of the reader/writer 100 electromagnetically coupled to the coil 252. The antenna part 140 supplies the ID information as received to the control interface part 120 which responds thereto by issuing a request for checking the validity of the ID information to the note-type personal computer 300 or a host computer or other connected to the control interface part.

Alternatively, the reader/writer 100 may be so designed as to prompt the user to input the password and/or fingerprint, voiceprint or iris information. In this manner, check can simultaneously be performed as to whether or not the user is the authorized owner of the noncontact information medium or media 200. In that case, a fingerprint reader or the like (not shown) will have to be employed in combination with the reader/writer 100. Subsequently, when it is confirmed that the ID information is genuine, the user can make access to the note-type personal computer 300 or the database of a host computer connected thereto. In case the ID information is not genuine, the user access is rejected, needless to say.

In the foregoing, description has been made of the preferred embodiments of the present invention. It should however be appreciated that various modifications and variations are possible within the purview of the present invention. For example, in the illustrated embodiments, a close-fit-type noncontact information medium whose communication range is short or narrow is employed as the noncontact information media 200. It should however be understood that the teachings of the present invention can find applications to numerous noncontact information media in general. In addition, by implementing the antenna 142 of the communication module 110 incorporated in the reader/writer 100 to be larger than the antenna included in the noncontact information media 200, the positioning error between the reader/writer 100 and the noncontact information medium 200 can be absorbed.

With the information Input/output unit according to an exemplary embodiment of the present invention, communication with the close-fit-type noncontact information medium can be performed without fail, whereby enhanced reliability can be ensured for the data communication. Besides, with the noncontact information medium according to an exemplary embodiment of the present invention, different types of data can be stored for realizing the multi-function performance.

What is claimed is:

1. An information input/output unit comprising:
a main body having an antenna part for exchanging information with noncontact information media; and
a position regulating device for selectively regulating positions of at least a part of a periphery of said noncontact information media in dependence on the species of said noncontact information media, respectively, such that said antenna part can face oppositely a location at which said communication-destined antenna is incorporated in the noncontact information medium of any species inserted in said input/output unit as selected;
wherein said input/output unit performs information exchange with plural species of noncontact information media of different shapes incorporating internally communication-destined antennas at predetermined positions, respectively.

2. The information input/output unit set forth in claim 1, wherein said position regulating device has a corrugated surface which is brought into contact with said noncontact information media.

3. The information input/output unit set forth in claim 1, wherein said position regulation device comprises a positioning portion for positioning the noncontact information media having a curvilinear surface contour while engaging with said curvilinear surface contour.

4. The information input/output unit set forth in claim 1, wherein the shapes of the noncontact information media include those of a card and a token.

5. The information input/output unit set forth in claim 1, wherein said noncontact information media includes a coil-on IC chip.

6. The information input/output unit set forth in claim 1, wherein said position regulating device includes a notch which can facilitate a manual removal of said noncontact information media therefrom.

7. The information input/output unit set forth in claim 1, further comprising a pop-up mechanism which enables a mechanical removal of said noncontact information media from said position regulating device.

8. The information input/output unit set forth in claim 1, further comprising a first indicator indicating that communication with said noncontact information medium media is being performed.

9. The information input/output unit set forth in claim 8, further comprising a second indicator indicating that an error is occurring in the communication with said noncontact information medium media.

10. The information input/output unit set forth in claim 1, further comprising a third indicator indicating on/off-state of an electric power supply.

11. The information input/output unit set forth in claim 1, wherein said noncontact information media have different thicknesses, respectively.

12. The information input/output unit set forth in claim 1, wherein:
said position regulating device has a structure selectively receiving the noncontact information media based on the kind and the shape of the noncontact information media.

* * * * *